US010174235B2

(12) United States Patent
Junge et al.

(10) Patent No.: US 10,174,235 B2
(45) Date of Patent: Jan. 8, 2019

(54) LOW GLOBAL WARMING POTENTIAL BINARY REFRIGERANT MIXTURE WITH COMPARABLE ENERGY EFFICIENCY TO R-134A AND A LOWER HEAT OF COMBUSTION

(71) Applicant: Haier US Appliance Solutions, Inc., Wilmington, DE (US)

(72) Inventors: Brent Alden Junge, Evansville, IN (US); Richard DeVos, Goshen, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 15/446,062

(22) Filed: Mar. 1, 2017

(65) Prior Publication Data

US 2018/0251665 A1    Sep. 6, 2018

(51) Int. Cl.
   *C09K 5/04* (2006.01)
   *F25B 5/02* (2006.01)

(52) U.S. Cl.
   CPC ........... *C09K 5/045* (2013.01); *F25B 5/02* (2013.01); *C09K 2205/12* (2013.01); *C09K 2205/126* (2013.01); *C09K 2205/40* (2013.01); *F25B 2341/0661* (2013.01); *F25B 2400/12* (2013.01); *F25B 2400/121* (2013.01)

(58) Field of Classification Search
   CPC ... C09K 5/045; C09K 2205/126; C09K 5/042
   See application file for complete search history.

(56) References Cited

U.S. PATENT DOCUMENTS

| 8,808,570 B2 | 8/2014 | Low | |
| 2015/0252240 A1* | 9/2015 | Van Horn | C09K 5/00 252/68 |
| 2017/0002243 A1* | 1/2017 | Porter | C09K 5/041 |
| 2017/0074747 A1* | 3/2017 | Scancarello | C09K 5/041 |

FOREIGN PATENT DOCUMENTS

WO    WO2011038570 A1    4/2011

OTHER PUBLICATIONS

Qiu, Jinyou; Zhang, Hua; Wang, Zilong; and Zhou, Zhigang, Theoretical analysis of low GWP mixture R600a/R1234ze as a possible alternative to R600a in domestic refrigerators, (2014), International Refrigeration and Air Conditioning Conference, Paper 1516, http://docs.lib.purdue.edu/iracc/1516.

* cited by examiner

*Primary Examiner* — John R Hardee
(74) *Attorney, Agent, or Firm* — Dority & Manning, P.A.

(57) ABSTRACT

The present invention provides a binary refrigerant mixture that can be used in single or dual evaporator refrigeration systems to provide for efficient cooling without the use of a high global warming potential (GWP) hydrofluorocarbon refrigerant such as R-134a and that is less flammable than a hydrocarbon refrigerant such as R-600 (n-butane) or R-600a (isobutane). Further, the binary refrigerant mixture can be classified as an A2 refrigerant in that it has a heat of combustion of less than 19 kilojoules per kilogram. In addition, the binary refrigerant mixture has a comparable energy efficiency when compared to R-134a and can be used in refrigeration systems designed for use with R-600 or R-600a refrigerants without having to change their design (i.e., without having to change the compressor design).

18 Claims, 2 Drawing Sheets

LOW GLOBAL WARMING POTENTIAL BINARY REFRIGERANT MIXTURE WITH COMPARABLE ENERGY EFFICIENCY TO R-134A AND A LOWER HEAT OF COMBUSTION

FIELD OF THE INVENTION

The subject matter of the present disclosure relates to a refrigerant for use in a single evaporator or dual evaporator refrigeration system that has a lower heat of combustion than an R-134a refrigerant yet exhibits comparable energy efficiency.

BACKGROUND OF THE INVENTION

Many refrigeration systems utilize a hydrofluorocarbon (HFC) refrigerant, such as R-134a (1,1,1,2-tetrafluoroethane). HFC refrigerants contain hydrogen, fluorine, and carbon and thus do not contain any ozone depleting substances, which is in contrast to chlorofluorocarbon (CFC) or hydrofluorocarbon (HCFC) refrigerants, which both contain chlorine and which have been phased out of use in refrigeration systems. However, although HFC refrigerants have an ozone depleting potential (ODP) of zero, compared to CFC and HCFC refrigerants which have ODPs as high as 1, HFCs have a high global warming potential (GWP), where GWP is the measure of how much heat a greenhouse gas traps in the atmosphere. For example, R-134 has a GWP of over 1300. For comparison, carbon dioxide is used as the control in determining GWP and has a GWP of one.

As such, many refrigerator manufacturers have contemplated using a natural refrigerant such as n-butane (R-600) or isobutane (R-600a), as these refrigerants have an ODP of zero and a GWP that is less than 10 and are also highly energy efficient. However, one drawback to the use of these natural refrigerants is that they are highly flammable and are classified as A3 refrigerants since they have a heat of combustion of greater than 19 kilojoules/kilogram. For example, butane has a heat of combustion of about 50 kilojoules/kilogram. Because these refrigerants are classified as A3 refrigerants, they are subject to a charge size limit of 57 or 150 grams in order to comply with various standards, meaning these refrigerants cannot be used in larger refrigeration systems that require more refrigerant. For comparison, if a refrigerant is classified as an A2 refrigerant having a heat of combustion of less than 19 kilojoules/kilogram, it is subject to a charge size limit of 225 grams.

Another option is to use a hydrofluoroolefin (HFO) refrigerant such as R-1234yf (2,3,3,3-tetrafluoropropene) or R-1234ze (1,3,3,3-tetrafluoropropene), which have an ODP of zero and a GWP of less than 10 and are classified as A2 refrigerants because they have a heat of combustion of around 10 kilojoules/kilogram. However, one drawback to the use of these refrigerants is that they are less energy efficient than R-134a. Further, HFO refrigerants are expensive, although R-1234ze is much less expensive than R-1234yf.

Another option is to use carbon dioxide (R-744) based refrigerants, as carbon dioxide as an ODP of zero and a GWP of 1. However, carbon dioxide refrigerants cannot be used in compressors designed for other refrigerants such as R-600, R-600a, etc. due to the higher refrigeration capacity (e.g., a different motor/displacement combination is required). Further, carbon dioxide has higher operating and standstill pressures which increases leak potential and can be hazardous. Additionally, R-744 systems require the use of steel or stainless steel pipes due to the higher operating and standstill pressures.

Accordingly, an energy efficient refrigerant having a low GWP that could be classified as an A2 refrigerant, making it suitable for use in larger refrigeration systems would be useful. A refrigerant having comparable energy efficiency to R-134a would also be useful. In addition, a refrigeration system incorporating such a refrigerant without having to change current compressor designs would also be useful.

BRIEF DESCRIPTION OF THE INVENTION

The present invention provides a binary refrigerant mixture that can be used in single or dual evaporator refrigeration systems to provide for efficient cooling without the use of a high global warming potential (GWP) hydrofluorocarbon refrigerant such as R-134a and that is less flammable than a hydrocarbon refrigerant such as R-600 (n-butane) or R-600a (isobutane). Further, the binary refrigerant mixture can be classified as an A2 refrigerant in that it has a heat of combustion of less than 19 kilojoules per kilogram. In addition, the binary refrigerant mixture has a comparable energy efficiency when compared to R-134a and can be used in refrigeration systems designed for use with R-600 or R-600a refrigerants without having to change their design (i.e., without having to change the compressor design).

In particular, the binary refrigerant mixture contains only two refrigerant components and is a blend of a hydrofluoroolefin refrigerant and a hydrocarbon refrigerant. Specifically, the binary refrigerant mixture contains R-1234ze(E) (1,3,3,3-tetrafluoropropene) and one of R-600 (n-butane) or R-600a (isobutane). Additional aspects and advantages of the invention will be set forth in part in the following description, or may be apparent from the description, or may be learned through practice of the invention.

In one exemplary embodiment, a binary refrigerant mixture is provided. The binary refrigerant mixture includes a first refrigerant and a second refrigerant. The first refrigerant is present in an amount ranging from about 20 wt. % to about 22.5 wt. % based on the total weight of the binary refrigerant mixture. Further, the first refrigerant is R-600 (n-butane) or R-600a (isobutane). Meanwhile, the second refrigerant is present in an amount ranging from about 77.5 wt. % to about 80 wt. % based on the total weight of the binary refrigerant mixture, and the second refrigerant is R-1234ze(E) (1,3,3,3-tetrafluoropropene).

In a second exemplary embodiment, a refrigeration system is provided. The refrigeration system includes a binary refrigerant mixture, a compressor, a condenser, an expansion device, and an evaporator. The binary refrigerant mixture includes a first refrigerant and a second refrigerant. The first refrigerant is present in an amount ranging from about 20 wt. % to about 22.5 wt. % based on the total weight of the binary refrigerant mixture, while the second refrigerant is present in an amount ranging from about 77.5 wt. % to about 80 wt. % based on the total weight of the binary refrigerant mixture. Further, the first refrigerant is R-600 (n-butane) or R-600a (isobutane) and the second refrigerant is R-1234ze(E). The compressor provides a pressurized flow of the binary refrigerant mixture. The condenser is configured to receive and cool the flow of pressurized binary refrigerant mixture. The expansion device receives the pressurized binary refrigerant mixture from the condenser and is configured for reducing the pressure of the pressurized binary refrigerant mixture. Further, the evaporator is configured to receive and evaporate at least a portion of the binary refrigerant mixture and provide an inlet refrigerant flow to the compressor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
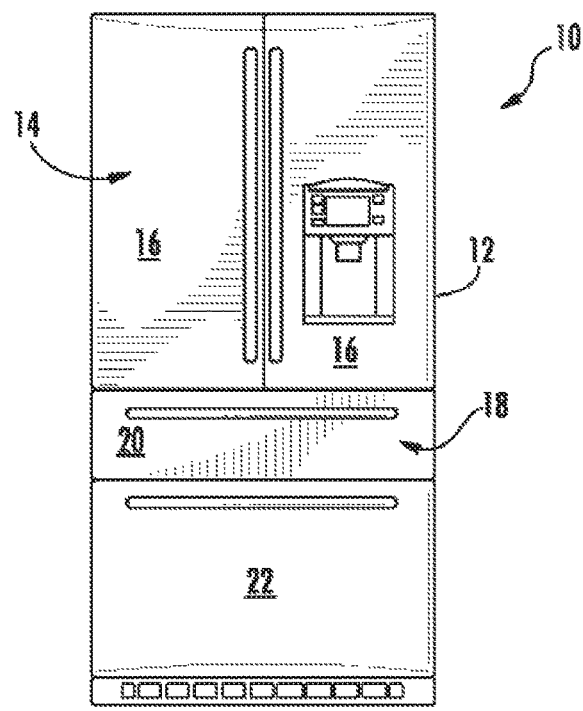
FIG. 1 is a front elevation view of an exemplary embodiment of a refrigerator appliance.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The binary refrigerant mixture of the present invention can be used in a single evaporator refrigeration system or a dual evaporator refrigeration system, the components of which are discussed in more detail below with respect to FIGS. 1-3. Further, the compressor used in the refrigeration system can be compatible with or designed for an R-600 (n-butane) or R-600a (isobutane) refrigerant. In any event, the binary refrigerant mixture includes a first refrigerant and a second refrigerant. The first refrigerant is R-600 (n-butane) or R-600a (isobutane) and has a heat of combustion of about 50 kilojoules per kilogram, thus classifying it as an A3 refrigerant. The first refrigerant is present in an amount ranging from about 20 wt. % to about 22.5 wt. %, such as from about 20.5 wt. % to about 22.5 wt. %, such as from about 21 wt. % to about 22.5 wt. % based on the total weight of the binary refrigerant mixture. In one particular embodiment, the first refrigerant can be R-600 (n-butane) that is present in an amount of about 20 wt. % based on the total weight of the binary refrigerant mixture.

Meanwhile, the second refrigerant is a hydrofluoroolefin refrigerant and is R-1234ze(E) (1,3,3,3-tetrafluoropropene) in particular. The second refrigerant has a heat of combustion of about 10 kilojoules per kilogram, thus classifying it as an A2 refrigerant. The second refrigerant is present in an amount ranging from about 77.5 wt. % to about 80 wt. %, such as from about 77.5 wt. % to about 79.5 wt. %, such as from about 77.5 wt. % to about 79 wt. % based on the total weight of the binary refrigerant mixture.

Regardless of the particular weight percentages of the first refrigerant and second refrigerant discussed above, the resulting binary refrigerant mixture meets the requirements of an A2 refrigerant in that it has a heat of combustion of less than 19 kilojoules per kilogram and is thus less flammable than R-600 (n-butane) or R-600a (isobutane) used alone. As such, the binary refrigerant mixture can be used in refrigeration systems in amounts up to 225 grams, so the binary refrigerant mixture can be used in larger systems such as upright freezers, unlike an A2 refrigerant which is currently limited to 57 grams. In addition, because of the specific combination and weight percentages of the first refrigerant and the second refrigerant, the binary refrigerant mixture of the present invention can exhibit comparable energy efficiency to an R-134a (1,1,1,2-tetrafluoroethane) refrigerant, such as when used in a refrigeration system that includes a compressor compatible with or designed for use with an R-600 or an R-600a compressor. Additionally, the binary refrigerant mixture can enable the R-600 or the R-600a compressor to have a run time ranging from about 50% to about 53%, such as from about 50.5% to about 52.5%, such as from about 51% to about 52%. Further, the binary refrigerant mixture is free of carbon dioxide to avoid the problems associated with the use of refrigerants containing carbon dioxide discussed above.

Various embodiments of refrigeration systems (e.g., refrigerators, freezers, refrigerator/freezer combinations) that can use the binary refrigerant mixture of the present invention, including a single evaporator system and a dual evaporator system, are discussed below with respect to FIGS. 1 to 3.

Figure 2:
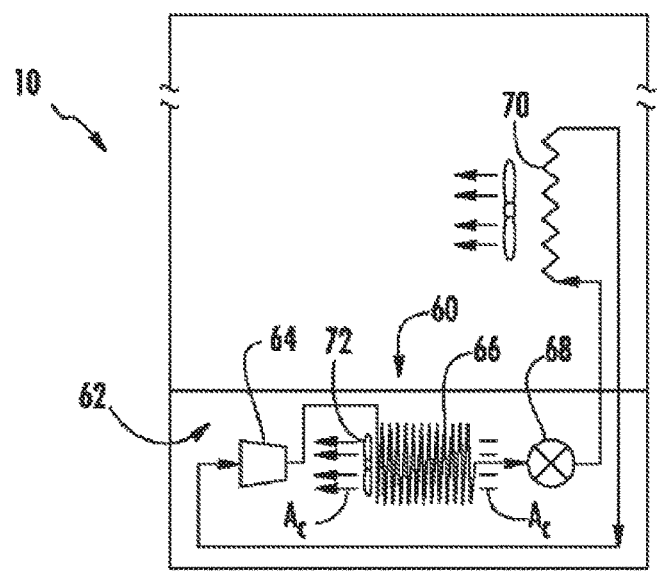
FIG. 2 provides a schematic view of a single evaporator refrigeration system that can be used in e.g., the refrigerator appliance of FIG. 1 in conjunction with the binary refrigerant mixture of the present subject matter.

For example, FIG. 1 depicts a refrigerator appliance 10 that incorporates a sealed refrigeration system 60 (FIG. 2). It should be appreciated that the term "refrigerator appliance" is used in a generic sense herein to encompass any manner of refrigeration appliance, such as a freezer, refrigerator/freezer combination, and any style or model of conventional refrigerator. In addition, it should be understood that the present subject matter is not limited to use in appliances. Thus, the present subject matter may be used for any other suitable purpose, such as vapor compression within air conditioning units or air compression within air compressors.

In the illustrated exemplary embodiment shown in FIG. 1, the refrigerator appliance 10 is depicted as an upright refrigerator having a cabinet or casing 12 that defines a number of internal chilled storage compartments. In particular, refrigerator appliance 10 includes upper fresh-food compartment 14 having doors 16 and lower freezer compartment 18 having upper drawer 20 and lower drawer 22. The drawers 20 and 22 are "pull-out" drawers in that they can be manually moved into and out of the freezer compartment 18 on suitable slide mechanisms.

FIG. 2 is a schematic view of certain components of refrigerator appliance 10, including a sealed refrigeration system 60 of refrigerator appliance 10. A machinery compartment 62 contains components for executing a known vapor compression cycle for cooling air. The components include a compressor 64, a condenser 66, an expansion device 68, and an evaporator 70 connected in series and charged with a refrigerant, such as the binary refrigerant mixture of the present invention. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, the refrigerant flows into compressor 64, which operates to increase the pressure of the refrigerant. This compression of the refrigerant raises its temperature, which is lowered by passing the refrigerant through condenser 66. Within condenser 66, heat exchange with ambient air takes place so as to cool the refrigerant. A fan 72 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, for example, increase the efficiency of condenser 66 by improving cooling of the refrigerant contained therein. In some refrigeration systems, the condenser is cooled by natural convection to save the cost of a fan. Natural convection condensers are typically found in compact refrigerators and also in freezers of all sizes. One of the more common natural convection designs is to thermally connect the condenser tubing to outer shell of the cabinet.

An expansion device (e.g., a valve, capillary tube, or other restriction device) 68 receives the refrigerant from condenser 66. From expansion device 68, the refrigerant enters evaporator 70. Upon exiting expansion device 68 and entering evaporator 70, the refrigerant drops in pressure. Due to the low pressure phase change of the refrigerant, evaporator 70 is cool relative to compartments 14 and 18 of refrigerator appliance 10. As such, cooled air is produced and refrigerates compartments 14 and 18 of refrigerator appliance 10. Thus, evaporator 70 is a type of heat exchanger which transfers heat from air passing over evaporator 70 to the refrigerant flowing through evaporator 70.

Collectively, the vapor compression cycle components in a refrigeration circuit, associated fans, and associated compartments are sometimes referred to as a sealed refrigeration system operable to force cold air through compartments 14, 18 (FIG. 1). The refrigeration system 60 depicted in FIG. 2 is provided by way of example only. Thus, it is within the scope of the present subject matter for other configurations of the refrigeration system to be used as well.

Figure 3:
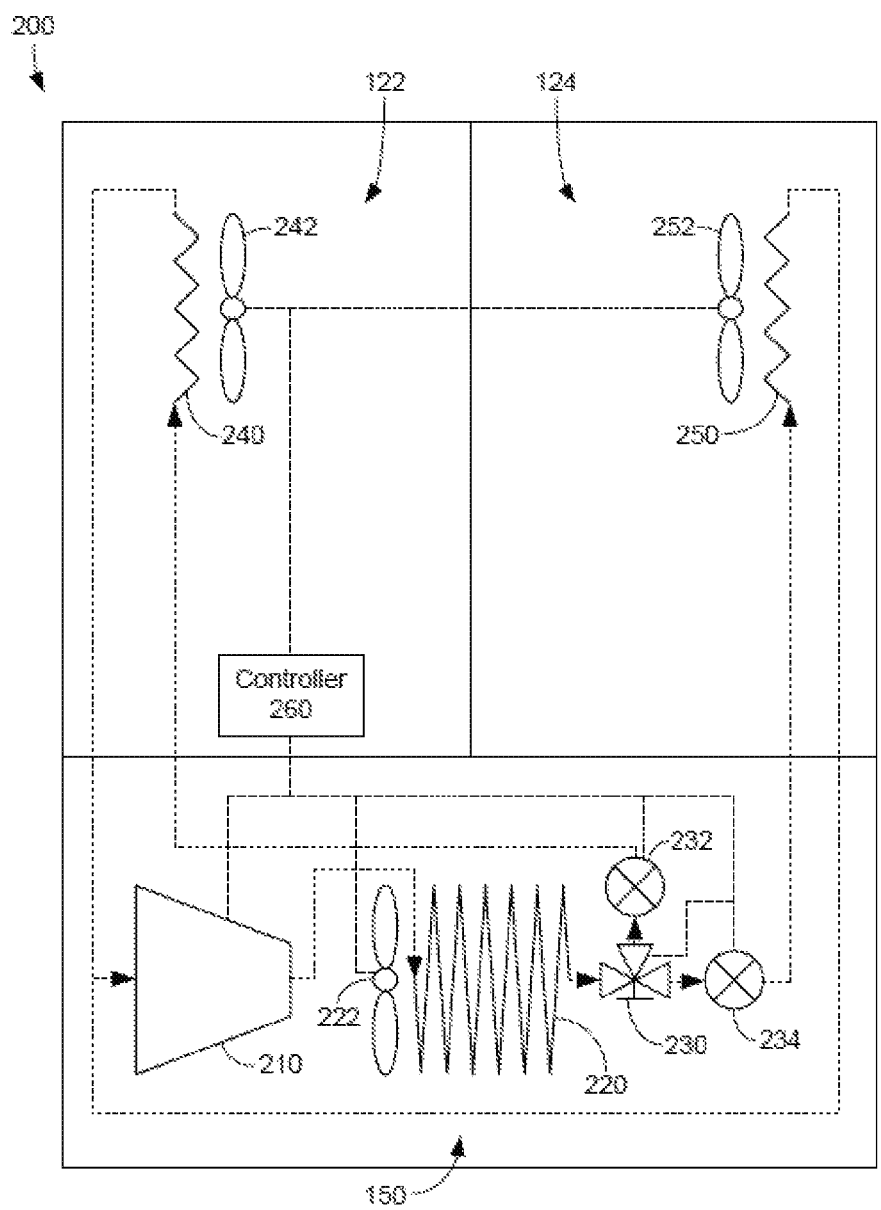
FIG. 3 provides a schematic view of a dual evaporator refrigeration system that can be used in e.g., the refrigerator appliance of FIG. 1 in conjunction with the binary refrigerant mixture of the present subject matter.

FIG. 3 provides a schematic view of a sealed system 200 for an appliance according to another exemplary embodiment of the present subject matter. The sealed system 200 can be used in any suitable refrigerator appliance. For example, the sealed system 200 may be used in refrigerator appliance 100, e.g., to cool fresh food chamber 122 and/or freezer chamber 124. Components of the sealed system 200 may be positioned within a machinery compartment 150, e.g., at bottom 102 of housing 120.

The sealed system 200 contains components for executing a vapor compression cycle for cooling air and/or liquid. The components include a compressor 210, a condenser 220, a control valve 230, a first expansion device 232, a second expansion device 234, a fresh food chamber or first evaporator 240 and a freezer chamber or second evaporator 250 connected in series and charged with a refrigerant, such as the binary refrigerant mixture of the present invention. First evaporator 240 may be positioned within fresh food chamber 122 and cool air therein. Conversely, second evaporator 250 may be positioned within freezer chamber 124 and cool air therein. Thus, sealed system 200 is commonly referred to as a parallel dual evaporator sealed system. However, it should be understood that the present subject matter is not limited to use with parallel dual evaporator sealed systems and may be implemented in a serial dual evaporator sealed systems, a hybrid dual evaporator sealed system or a single evaporator sealed system.

Within sealed system 200, gaseous refrigerant flows into the compressor 210, which operates to increase the pressure of the refrigerant. This compression of the refrigerant raises its temperature, which is lowered by passing the gaseous refrigerant through condenser 220. Within condenser 220, heat exchange with ambient air takes place so as to cool the refrigerant and cause the refrigerant to condense to a liquid state. A condenser fan 222 is used to pull air across condenser 220 so as to provide forced convection for a more rapid and efficient heat exchange between the refrigerant within condenser 220 and the ambient air. Thus, as will be understood by those skilled in the art, increasing air flow across condenser 220 can, e.g., increase the efficiency of condenser 220 by improving cooling of the refrigerant contained therein.

Control valve 230 regulates flows of the refrigerant from condenser 220 to first and second expansion devices 232 and 234. For example, control valve 230 can selectively terminate and initiate flows of the refrigerant from condenser 220 to first expansion device 232 and/or second expansion device 234. Thus, first and second expansion devices 232 and 234 (e.g., valves, capillary tubes, or other restriction devices) receive the liquid refrigerant from condenser 220 depending upon the configuration of control valve 230.

From first expansion device 232, liquid refrigerant enters first evaporator 240. Upon exiting first expansion device 232 and entering first evaporator 240, the liquid refrigerant drops in pressure and vaporizes. Due to the low pressure phase change of the refrigerant, first evaporator 240 is cool relative to fresh food chamber 122 of refrigerator appliance 100. As such, cooled air is produced and configured to refrigerate fresh food chamber 122 of refrigerator appliance 100. Thus, first evaporator 240 is a type of heat exchanger which transfers heat from air passing over first evaporator 240 to refrigerant flowing through first evaporator 240.

Similarly, liquid refrigerant enters second evaporator 250 from second expansion device 234. Upon exiting second expansion device 234 and entering second evaporator 250, the liquid refrigerant drops in pressure and vaporizes. Due to the pressure drop and phase change of the refrigerant, second evaporator 250 is cool relative to freezer chamber 124 of refrigerator appliance 100. As such, cooled air is produced and configured to refrigerate freezer 124 of refrigerator appliance 100. Thus, second evaporator 250 is a type of heat exchanger which transfers heat from air passing over second evaporator 250 to refrigerant flowing through second evaporator 250.

Sealed system 200 also includes a fresh food or first fan 242 and a freezer or second fan 252. The first fan 242 is positioned at or adjacent first evaporator 240, e.g., within fresh food chamber 122. When activated, the first fan 242 directs or urges air over the first evaporator 240, e.g., and circulates such air within the fresh food chamber 122. Similarly, the second fan 252 is positioned at or adjacent the second evaporator 250, e.g., within freezer chamber 124. When activated, the second fan 252 directs or urges air over the second evaporator 250, e.g., and circulates such air within the freezer chamber 124.

Operation of sealed system 200 is controlled by a processing device or controller 260, e.g., that may be operatively coupled to a control panel (not shown) for user manipulation to select refrigeration features of sealed system 200. Controller 260 can operates various components of sealed system 200 to execute selected system cycles and features. For example, controller 260 is in operative communication with compressor 210, condenser fan 222, control valve 230, first and second expansion devices 232 and 234, and first and second fans 242 and 252. Thus, controller 260 can selectively activate and operate compressor 210, condenser fan 222, control valve 230, first and second expansion devices 232 and 234, and first and second fans 242 and 252.

Controller 260 may include a memory and microprocessor, such as a general or special purpose microprocessor operable to execute programming instructions or microcontrol code associated with operation of sealed system 200. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 260 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Compressor 210, condenser fan 222, control valve 230, first and second expansion devices 232 and 234, and first and second fans 242 and 252 may be in communication with controller 260 via one or more signal lines or shared communication busses.

Sealed system 200 depicted in FIG. 3 is provided by way of example only. Thus, it is within the scope of the present subject matter for other configurations of the sealed system to be used as well. As will be understood by those skilled in the art, sealed system 200 may include additional components, e.g., at least one additional evaporator, compressor, expansion device, and/or condenser.

The binary refrigerant mixture and its use in refrigeration systems such as the refrigeration systems discussed with respect to FIGS. 1 to 3 may be better understood by reference to the following examples.

EXAMPLE 1

In Example 1, the energy efficiency of 100% R-134a, a binary refrigerant mixture of 80% R-1234ze(E)/20% R-600, a binary refrigerant mixture of 80% R-1234yf/20% R-600a, and 100% R-1234yf in a refrigeration system (upright freezer) utilizing an R-134a compressor were compared. The results are shown below in Table 1.

TABLE 1

| | R-134a Compressor | | | |
| --- | --- | --- | --- | --- |
| | Refrigerant | | | |
| | R-134a | 80% R-1234ze(E) 20% R-600 | 80% R-1234yf 20% R-600a | 100% R-1234yf |
| Power (On/Off) (Average Watts) | 59.81 | 63.61 | 63.39 | 65.03 |
| % Power Increase Compared to R-134a | — | 6.35 | 5.99 | 8.72 |
| Average Freezer Temperuature (° F.) | −0.94 | −0.89 | −0.94 | −0.94 |
| Condenser (In) Temperature (° F.) | 154.89 | 143.72 | 149.24 | 150.65 |
| Condenser (Out) Temperature (° F.) | 104.31 | 103.94 | 107.43 | 106.94 |

TABLE 1-continued

| | R-134a Compressor | | | |
| --- | --- | --- | --- | --- |
| | Refrigerant | | | |
| | R-134a | 80% R-1234ze(E) 20% R-600 | 80% R-1234yf 20% R-600a | 100% R-1234yf |
| Evaporator (Middle) Temperuature (° F.) | −15.48 | −13.24 | −15.62 | −15.41 |
| Power (Active) (Average Watts) | 113.27 | 99.20 | 123.09 | 120.35 |
| % of Time Compressor Running | 52.20 | 63.60 | 50.99 | 53.50 |

As shown in Table 1, the R-134a refrigerant used 59.81 average watts of power and used 113.27 average watts of power when the R-134a compressor was running/active. Further, the R-134a compressor ran for 52.2% of the time with the R-134 refrigerant. Meanwhile, the binary refrigerant mixture of 80% R-1234ze(E)/20% R-600 used 6.35% more energy as compared to the R-134a refrigerant, and the compressor was required to run longer at 63.6% of the time, although the power usage was decreased to 99.2% when the compressor was running. Next, the binary refrigerant mixture of 80% R-1234yf/20% R-600a used 5.99% more energy as compared to the R-134a refrigerant, and power usage was increased to 123.09% while the compressor was running, although the compressor did not run as long at 50.99%. Lastly, the 100% R-1234yf refrigerant used 8.72% more energy as compared to the R-134a refrigerant, the power usage was increased to 120.35% when the compressor was running, and the compressor was required to run longer at 53.5% of the time. In summary, the refrigerants tested as alternatives to the R-134 refrigerant increased energy usage by from about 6% to about 9% when used in a refrigeration system having a compressor designed from the R-134a refrigerant.

EXAMPLE 2

In Example 2, the energy efficiency of 100% R-134a, a binary refrigerant mixture of 80% R-1234ze(E)/20% R-600, and 100% R-600a in a refrigeration system (upright freezer) utilizing an R-600a compressor were compared. The results are shown below in Table 2.

TABLE 2

| | R-600a Compressor | | |
| --- | --- | --- | --- |
| | Refrigerant | | |
| | R-134a | 80% R-1234ze(E) 20% R-600 | 100% R-600a |
| Power (On/Off) (Average Watts) | 59.81 | 60.10 | 60.30 |
| % Power Increase Compared to R-134a | — | 0.54 | 0.82 |
| Average Freezer Temperuature (° F.) | −0.94 | −0.90 | −0.82 |
| Condenser (In) Temperature (° F.) | 154.89 | 159.10 | 146.81 |
| Condenser (Out) Temperature (° F.) | 104.31 | 107.70 | 101.35 |
| Evaporator (Middle) Temperature (° F.) | −15.48 | −15.20 | −13.34 |
| Power (Active) (Average Watts) | 113.27 | 116.50 | 95.07 |
| % of Time Compressor Running | 52.20 | 51.12 | 62.92 |

As shown in Table 2 the R-134a refrigerant used 59.81 average watts of power and used 113.27 average watts of power in the base test with the R134a compressor. Further, compressor ran for 52.2% of the time with the R-134 refrigerant. Meanwhile, the binary refrigerant mixture of 80% R-1234ze(E)/20% R-600 used only 0.54% more energy as compared to the R-134a refrigerant when used with an R600a compressor, and the compressor was only required to run for 51.12% of the time, although the power usage was increased slightly to 116.5 watts when the compressor was running. Next, the 100% R-600a refrigerant used 0.82% more energy as compared to the R-134a refrigerant, and the power usage decreased to 95.07 watts when the compressor was running, but the compressor was required to run longer at 62.92% of the time. In summary, the binary refrigerant mixture of 80% R-1234ze(E)/20% R-600 performed comparably to the R-134a refrigerant and the 100% R-600a refrigerant in terms of average power and compressor run time when used in a refrigeration system having a compressor designed from the R-600a refrigerant, indicating that the binary refrigerant mixture, which meets the requirements of an A2 refrigerant, can be used as an alternative to R-134a in larger refrigeration systems where use of the R-600a A3 refrigerant is either not feasible or desirable.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A binary refrigerant mixture for a refrigerant system comprising:
    (a) a first refrigerant, wherein the first refrigerant is present in an amount ranging from about 20 wt. % to about 22.5 wt. % based on the total weight of the binary refrigerant mixture, wherein the first refrigerant is R-600 (n-butane) or R-600a (isobutane); and
    (b) a second refrigerant, wherein the second refrigerant is present in an amount ranging from about 77.5 wt. % to about 80 wt. % based on the total weight of the binary refrigerant mixture, wherein the second refrigerant is R-1234ze(E).

2. The binary refrigerant mixture of claim 1, wherein the first refrigerant is R-600.

3. The binary refrigerant mixture of claim 1, wherein the binary refrigerant mixture has a heat of combustion of less than 19 kilojoules per kilogram.

4. The binary refrigerant mixture of claim 1, wherein the binary refrigerant is classified as an A2 refrigerant.

5. The binary refrigerant mixture of claim 1, wherein the binary refrigerant mixture is less flammable than R-600 (n-butane) or R-600a (isobutane) alone.

6. The binary refrigerant mixture of claim 1, wherein the first refrigerant is present in an amount ranging from about 21 wt. % to about 22.5 wt. % based on the total weight of the binary refrigerant mixture and the second refrigerant is present in an amount ranging from about 77.5 wt. % to about 79 wt. % based on the total weight of the binary refrigerant mixture.

7. The binary refrigerant mixture of claim 1, wherein the binary refrigerant mixture is compatible for use with refrigeration system having a compressor designed for use with R-600a or R-600.

8. The binary refrigerant mixture of claim 7, wherein the binary refrigerant mixture enables the R-600a or the R-600 compressor to have a run time ranging from about 50% to about 53% when charged with the binary refrigerant mixture.

9. The binary refrigerant mixture of claim 1, wherein the binary refrigerant mixture is free of carbon dioxide.

10. A refrigeration system comprising:
    a binary refrigerant mixture comprising:
        (a) a first refrigerant, wherein the first refrigerant is present in an amount ranging from about 20 wt. % to about 22.5 wt. % based on the total weight of the binary refrigerant mixture, wherein the first refrigerant is R-600 (n-butane) or R-600a (isobutane); and
        (b) a second refrigerant, wherein the second refrigerant is present in an amount ranging from about 77.5 wt. % to about 80 wt. % based on the total weight of the binary refrigerant mixture, wherein the second refrigerant is R-1234ze(E);
    a compressor for providing a pressurized flow of the binary refrigerant mixture;
    a condenser configured to receive and cool the flow of pressurized binary refrigerant mixture;
    an expansion device in receipt of the pressurized binary refrigerant mixture from the condenser and configured for reducing the pressure of the pressurized binary refrigerant mixture; and
    an evaporator configured to receive and evaporate at least a portion of the binary refrigerant mixture and provide an inlet refrigerant flow to the compressor.

11. The refrigeration system of claim 10, wherein the first refrigerant is R-600.

12. The refrigeration system of claim 10, wherein the binary refrigerant mixture has a heat of combustion of less than 19 kilojoules per kilogram and is classified as an A2 refrigerant.

13. The refrigerant of claim 10, wherein the binary refrigerant mixture is less flammable than R-600 (n-butane) or R-600a (isobutane) alone.

14. The refrigeration system of claim 10, wherein the first refrigerant is present in an amount ranging from about 21 wt. % to about 22.5 wt. % based on the total weight of the binary refrigerant mixture and the second refrigerant is present in an amount ranging from about 77.5 wt. % to about 79 wt. % based on the total weight of the binary refrigerant mixture.

15. The refrigeration system of claim 10, wherein the compressor is designed for use with an R-600 or an R-600a refrigerant.

16. The refrigeration system of claim 15, wherein the binary refrigerant mixture enables the compressor to have a run time ranging from about 50% to about 53% when charged with the binary refrigerant mixture.

17. The refrigeration system of claim 10, wherein the binary refrigerant mixture is free of carbon dioxide.

18. The refrigeration system of claim 10, further comprising an additional expansion device and an additional evaporator.

* * * * *